United States Patent [19]

Na

[11] Patent Number: 5,296,931
[45] Date of Patent: Mar. 22, 1994

[54] CHANNEL SELECTING METHOD FOR PROGRAMS OF THE SAME CATEGORY

[75] Inventor: Un-heui Na, Seoul, Rep. of Korea
[73] Assignee: Samsung Electronics Co., Ltd., Kyunggi-do, Rep. of Korea
[21] Appl. No.: 849,465
[22] Filed: Mar. 11, 1992

[30] Foreign Application Priority Data

Mar. 11, 1991 [KR] Rep. of Korea .................. 91-3861

[51] Int. Cl.$^5$ .................... H04N 5/44; H04N 5/50
[52] U.S. Cl. ........................... 348/731; 348/732; 348/725
[58] Field of Search .............. 358/191.1, 192.1, 193.1, 358/194.1, 195.1, 188, 160, 21, 142, 147, 86; 455/186.1, 151.1, 154, 158, 186; H04N 5/50, 5/44

[56] References Cited

U.S. PATENT DOCUMENTS

| | | | |
|---|---|---|---|
| 4,706,121 | 11/1987 | Young | 358/142 |
| 4,891,703 | 1/1990 | Noudan | 358/142 |
| 4,894,714 | 1/1990 | Christis | 358/191.1 |
| 4,908,707 | 3/1990 | Kinghorn | 358/194.1 |
| 5,036,394 | 7/1991 | Morii et al. | 358/146 |
| 5,038,211 | 8/1991 | Hallenbeck | 358/146 |
| 5,068,734 | 11/1991 | Beery | 358/191.1 |
| 5,210,611 | 5/1993 | Yee et al. | 358/146 |

FOREIGN PATENT DOCUMENTS

| | | | |
|---|---|---|---|
| 0030488 | 2/1987 | Japan | H04N 7/08 |
| 0190088 | 7/1990 | Japan | H04N 5/445 |
| 4044475 | 2/1992 | Japan | H04N 5/445 |

Primary Examiner—James J. Groody
Assistant Examiner—Michael H. Lee
Attorney, Agent, or Firm—Sughrue, Mion, Zinn, Macpeak & Seas

[57] ABSTRACT

A channel selecting method for programs of the same category is disclosed, wherein arbitrary channels are assigned according to the same types of programs as those contained in signals the broadcast sent from the broadcasting station using a VPS function. This method determines whether the received broadcast signal uses video program system broadcasting, encoding and recognizes codes according to the programs to arbitrarily assign channels for the programs according to the codes. Then, if a desired channel to be viewed is selected, the same types of programs corresponding to that channel can be automatically recognized, so that the broadcasting channel selection for viewing the same type of programs can be easily performed.

9 Claims, 4 Drawing Sheets

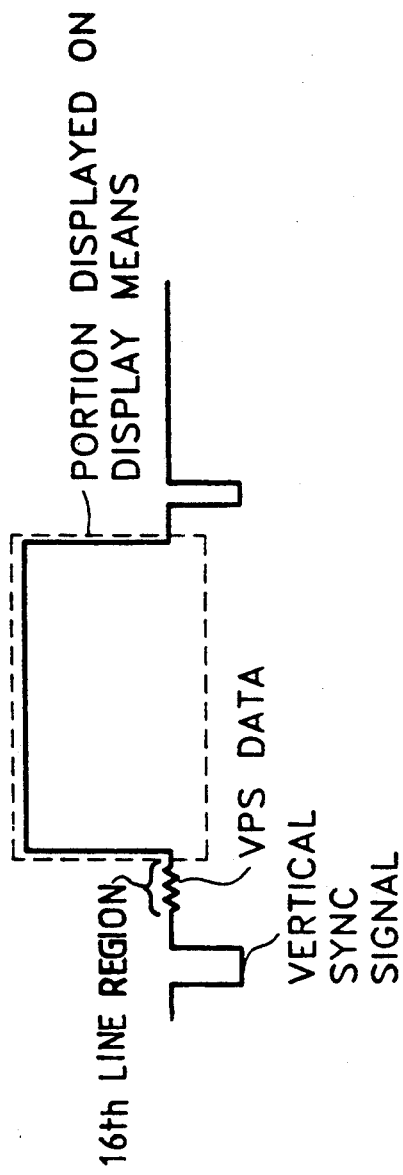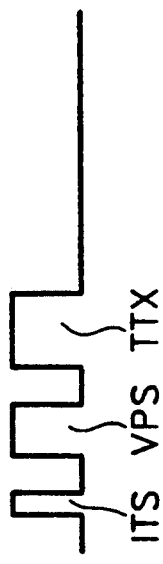

5,296,931

CHANNEL SELECTING METHOD FOR PROGRAMS OF THE SAME CATEGORY

BACKGROUND OF THE INVENTION

The present invention relates to a method for selecting a program received in a broadcasting signal receiving device, and more particularly to a method for selecting a broadcasting channel which is desired to be viewed, using a video program system (or service, hereinafter referred to as "VPS) function.

Generally speaking, a broadcasting signal receiving device includes a television receiver, an audio and/or video cassette recorder provided with a tuner, etc. If, a channel is selected in the tuner from the information sent from the broadcasting station, these broadcasting signal receivable devices display the information of the selected channel, so that a user can watch it. The VPS function is mainly used in a video tape recorder provided with a tuner, and particularly is used to control the record mode during preprogrammed recording. That is, as shown in FIG. 1A, the VPS uses digitally coded information to load and send information with respect to the program transmitted from the broadcasting station onto a predetermined region of the broadcast television signal bandwidth. This information is sent through the 16th line in the empty region except the region where a vertical synchronizing signal and a video signal (a portion displayed on a display unit) are loaded on the broadcasting signal which is sent in units of one field or frame at a time. The total transmittable information consists of 15 words which comprise data to recognize the transmission source (the broadcasting station), the program starting and ending times, record mode pauses, the program service and title, etc. Particularly, as shown in FIG. 1B, before a VPS code is supplied, an initial test signal (ITS) is output to inform a user in advance that a video program function will be performed. After the VPS code is generated, (TTX) information is supplied. Actually, the ITS, VPS, and TTX data are all included in the region which can carry teletext information.

The VPS information is used as predetermined information between the broadcasting station and the receiving end. Accordingly, if VPS information is sent from the broadcasting station, a VPS decoder decodes the supplied VPS code to distinguish the program, and outputs a data type to be recognized by a system controller within the set. The system controller compares the recording state of the program to be recorded which was previously stored by the user with data supplied from the VPS decoder. If there is a match, the system controller controls the recorder deck to perform the record mode. As described above, since preprogrammed recording is controlled by the VPS code sent from the broadcasting station, even if the broadcasting time of the intended program changes due to peculiar conditions at the broadcasting station, a VPS function offers the advantage of flexibly controlling the recording. However, using the VPS function, the direct selection of the viewing channel is impossible under the prior art methods as described above or other current methods.

SUMMARY OF THE INVENTION

Accordingly, it is an object of the present invention to provide a method for selecting a channel to be watched using a VPS function.

It is another object of the present invention to provide a channel selecting method for programs of the same category, using the VPS function, which classifies the programs received from the broadcasting station into similarly-typed programs, assigns user-designated channels according to the types, and selects the channel of desired programs.

It is still another object of the present invention to provide a channel selecting method for programs of the same category, which selects the desired channel by displaying corresponding video information of the broadcasting station transmitting like programs, using a PIP (picture-in-picture) function.

It is yet another object of the present invention to provide a channel selecting method for programs of the same category, for displaying channel information of the broadcasting station transmitting like programs, using an OSD (on-screen-display) function.

To achieve the above and other objects, a method for selecting channels for programs of the same category in a broadcasting signal receiving device comprising: a VPS decoder for decoding a video program system (VPS) code included in a video signal detected from a broadcasting signal received through an antenna and showing at least a program's starting time; a system controller for recognizing at least the program's starting time information by the information decoded in the VPS decoder; and display means for displaying the video signal under the control of the system controller, the method comprising the steps of:

classifying the decoded information into similar-typed programs when the information decoded in the VPS decoder is supplied to the system controller;

making the broadcast channels of the programs classified in the program category classifying step correspond to predetermined channels arbitrarily set in the system controller;

first selecting a channel corresponding to the desired program category from the predetermined channels;

displaying the information about the broadcast channel corresponding to the channel selected in the first channel selection step through the display means; and second selecting a broadcast channel by determining which broadcast channel is desired to be viewed through the displaying step.

Particularly, a channel selecting method for programs of the same category according to the present invention is characterized in that in the displaying step, in order for a user to be capable of selecting a broadcast channel, the desired channel to be viewed can be selected through a displayed main screen or subscreen by displaying on the subscreen at least one of the video signals of the broadcasting station transmitting the same type of program, or the desired channel to be viewed can be selected by displaying the broadcast channel information from a broadcasting station transmitting the same type of program as a character information type.

The channel selecting method for programs of the same category thus described detects a program using a VPS code for detecting at least the starting time information with respect to the program transmitted from the broadcasting station, and if the channel of the source (the broadcasting station) transmitting the detected programs is made to correspond to an arbitrary channel, the user can recognize the channels of the broadcasting station transmitting the same type of program through an arbitrary channel selection and can easily select the desired channel of the recognized channels.

BRIEF DESCRIPTION OF THE DRAWINGS

The above objects and other advantages of the present invention will become more apparent by the following description the preferred embodiment of the present invention with reference to the attached drawings, in which:

FIGS. 1A and 1B show television signals including video program system (VPS) data;

DETAILED DESCRIPTION OF THE INVENTION

Hereinafter, the present invention will be described with reference to the accompanying drawings.

Figure 2:
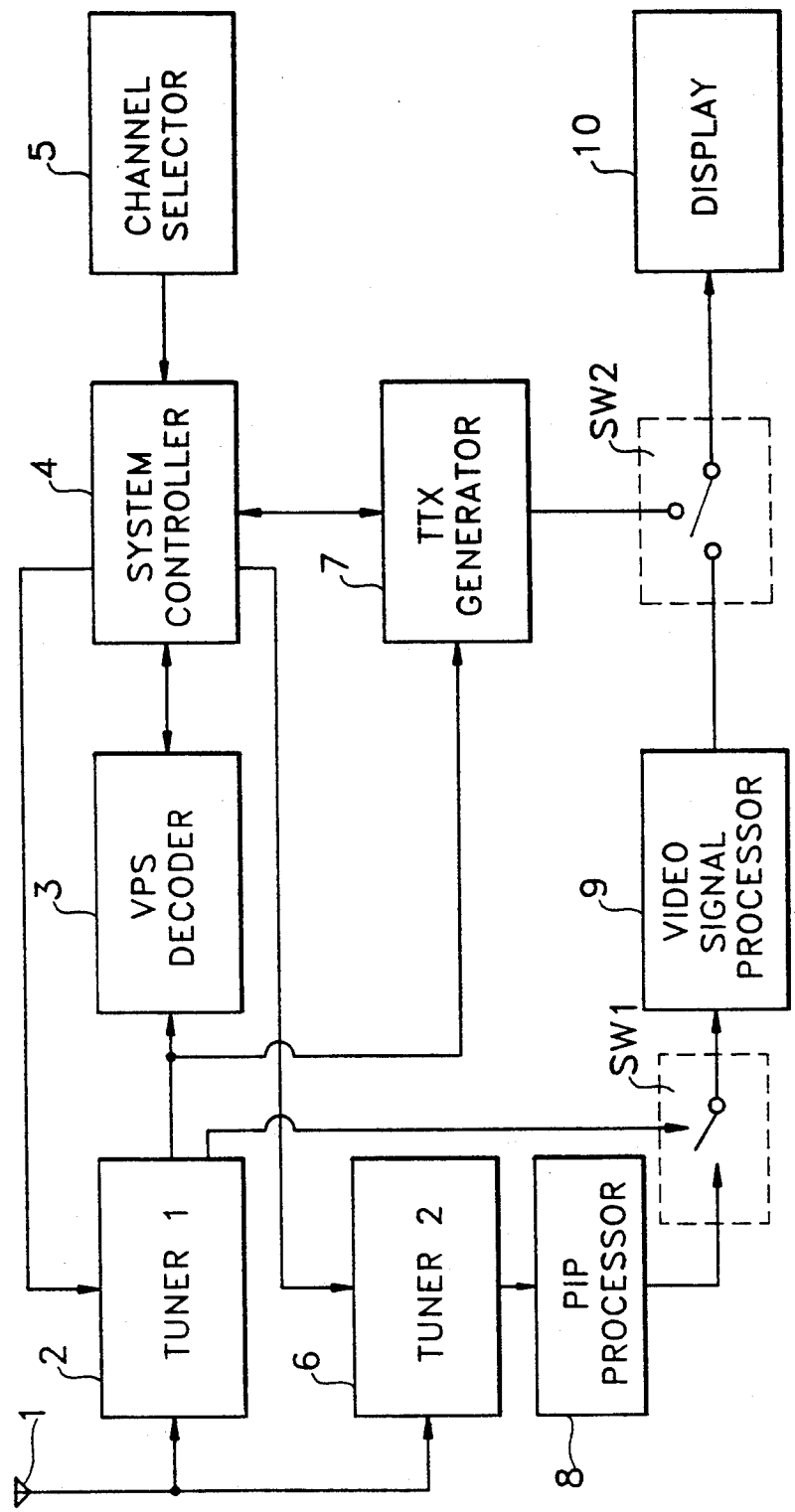
FIG. 2 is a block diagram of a device according to the present invention.

FIG. 2 is a block diagram of a device for embodying the channel selecting method for programs of the same category, which is applied to a device having the capability of receiving a broadcasting signal.

To achieve the present invention, the broadcasting station should assign program codes according to various broadcasting program categories. For instance, the character "A" may be assigned to amusement programs, the character "B" to sports programs, and the character "C" to serial dramas, and encoded onto the video signal output through the 16th line region of the broadcast television signal shown in FIG. 1A.

FIG. 2 shows a device embodying a channel selecting method for programs, which comprises an antenna 1 for receiving a video signal output from the broadcasting station, first and second tuners 2 and 6, respectively, for detecting the video signal received through the antenna 1, a VPS decoder 3 for detecting and decoding a VPS code from the video signal output from first tuner 2, a TTX generator 7 for detecting and generating a TTX code from the video signal output from first tuner 2, a system controller 4 for recognizing and temporarily storing the conditions (for instance, as mentioned above, the program's starting and ending times, its title, etc.) of the program sent from the broadcasting station according to the information output from VPS decoder 3 and TTX generator 7, and then controlling the channel selecting operation of first and second tuners 2 and 6 according to the supplied control information, a channel selector 5 for selecting an user-designated desired channel, and a broadcast channel according to the user's control order and information. A PIP processor 8 is also provided for PIP (Picture-In-Picture) processing to display the signal output from second tuner 6 on a subscreen, a first selection switch SW1 for selectively outputting the signal output from first tuner 2 and PIP processor 8 under the control of system controller 4, a video signal processor 9 for amplifying the signal output from first selection switch SW1 by an intermediate frequency and detecting the video signal, a second selection switch SW2 for selectively outputting the signals output from video signal processor 9 and TTX generator 7 under the control of system controller 4, and a displaying means 10 for displaying the signal output from second selection switch SW2.

Here, programs of the same category are programs of the same type, i.e., programs of a similar category (e.g., "A", "B" or "C") among transmitted programs from every broadcasting station. Also, an arbitrary channel is one which broadcasts similar programs mentioned above and can be set by the user. For instance, if channel 1 is set as a sports channel, all sports programs can be displayed by the selection of channel 1. Here, setting the arbitrary channels is performed for those channels other than the inherent channels of existing broadcasting stations, and the broadcast channels are the inherent channels of the broadcasting station.

Figure 3A:
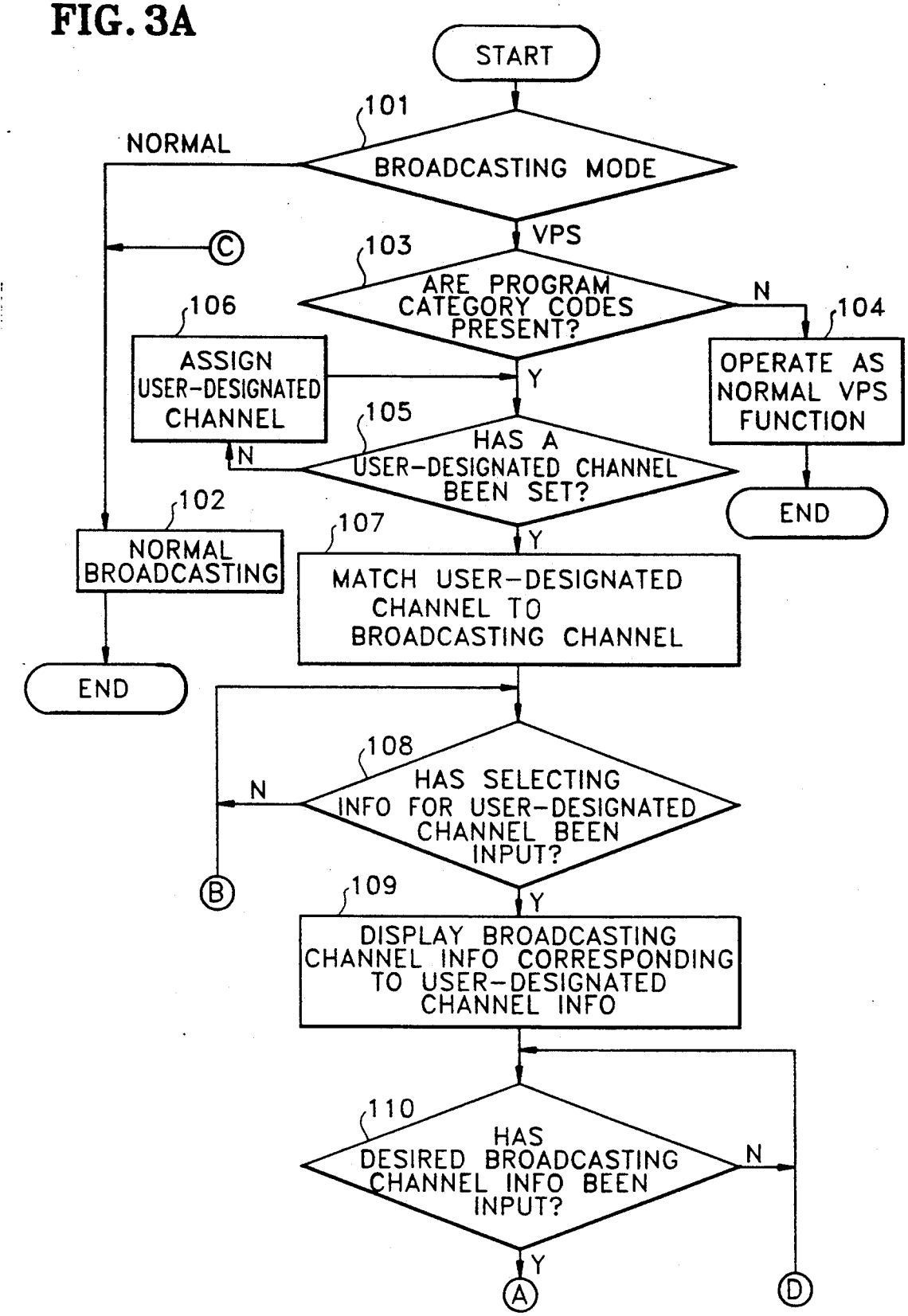
FIGS. 3A and 3B, taken together, show is a flowchart of the method for selecting the channels of the same program category according to the present invention.
Figure 3B:
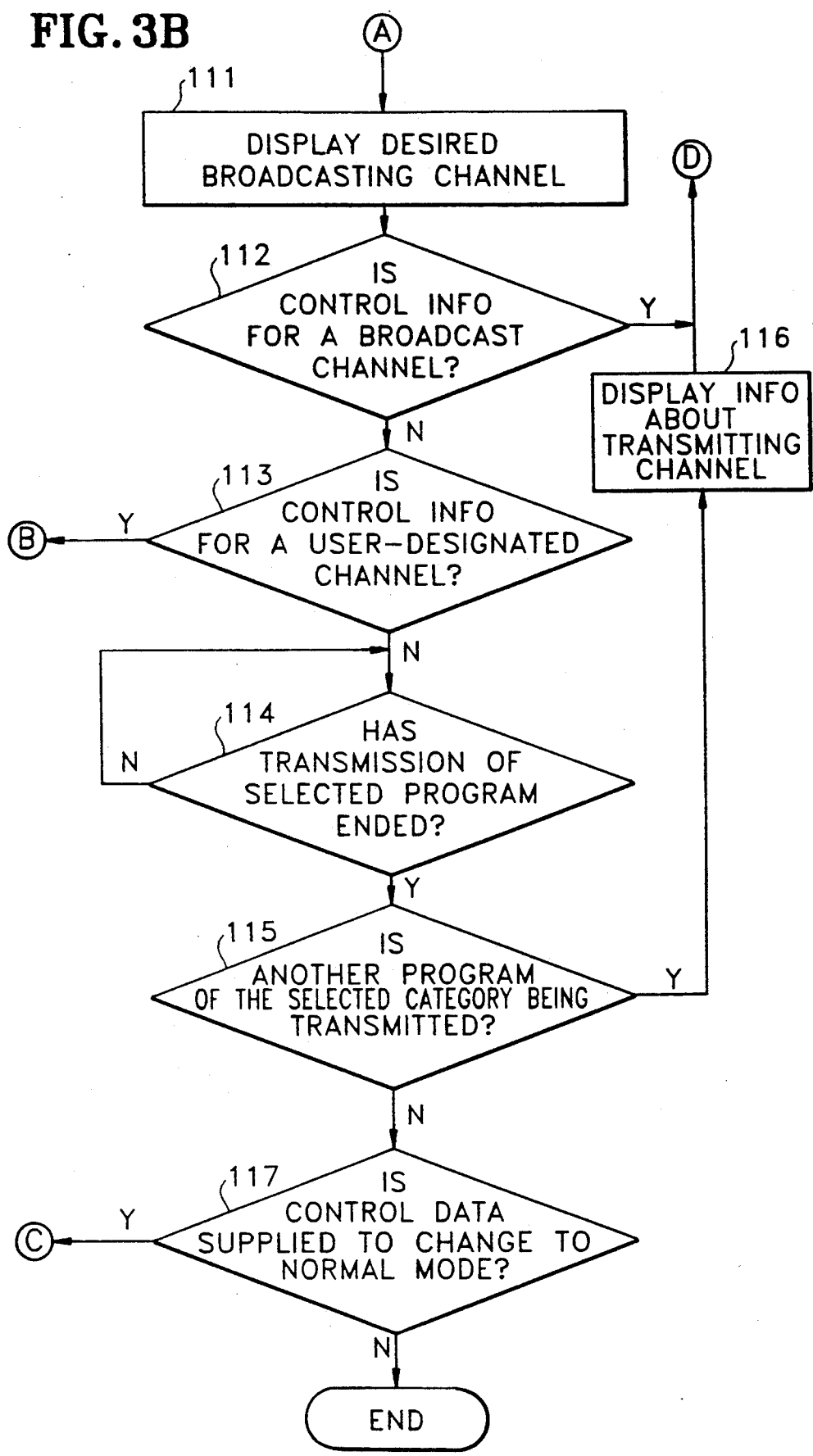

FIGS. 3A and 3B, taken together, are a flowchart showing the method for selecting the channels of like programs. An embodiment of the present invention will be described with reference to FIGS. 2, 3A and 3B.

When information sent from the broadcasting station is supplied through antenna 1, it is output to VPS decoder 3 through first tuner 2. At this time, if the VPS code is not present, the coding information is not supplied to system controller 4, thus the event is recognized as a normal broadcasting mode (step 101). Accordingly, normal broadcasting is carried out (step 102).

However, when the received broadcast is a VPS broadcasting signal, VPS decoder 3 performs the coding operation and supplies it to system controller 4. Using information supplied from VPS decoder 3, system controller 4 checks for the presence of a code which allows it to recognize the category of the program (step 103). If the codes which discriminate the program category are not supplied, the normal VPS function (the programmed recording function) is performed (step 104). On the other hand, when the codes which discriminate program types are present, system controller 4 checks whether a user-designated arbitrary channel is set (step 105). If the channel is not set, channel selector 5 assigns an arbitrary channel according to category (step 106). If a user-designated channel has been assigned and the program category code is present, the user-designated channel corresponds to the channels from respective sources (the broadcasting station) transmitting the program in the category matched to the user-designated channel (step 107).

When the user selects an arbitrary channel of the desired category to be viewed through channel selector 5 (step 108), the broadcasting channel information of the broadcasting stations corresponding to the selected arbitary channel are displayed (step 109). At this time, the broadcasting channel information can be displayed on displaying means 10 by generating a channel number through TTX generator 7, or by overlapping the video signal output from first tuner 2 with the output signal of second tuner 6 by controlling the first and second tuners 2 and 6 to select the corresponding broadcasting channel to thereby compress the signal output from second tuner 6 via PIP processor 8. Here, TTX generator 7 detects and decodes the TTX information transmitted on the region of the signal which carries the TTX information, as described above in connection with FIG. 1B, and then generates the character corresponding to the decoded information through a character information generator (or OSD circuit) (not shown). The TTX information exists even between the ITS and VPS information regions. Also, as well known in the art, PIP processor 8 processes the subscreen which will be inserted into the main screen, so as to insert a subscreen consisting of one frame in a predetermined region of the main screen.

If the user recognizes the channel information of the respective broadcasting stations transmitting the same types of programs by the above-described method and selects one broadcasting channel desired to be viewed (step 110), the video signal of the desired broadcasting channel is output to display means 10 through first tuner 2 and first control switch SW1 (step 111).

During viewing, if channel selection control information is supplied through channel selector 5, it is determined whether the supplied control information is broadcasting channel information of a program of the same category, (step 112) or whether it is arbitrary channel selecting information for selecting another type of program (step 113). Then, steps 110 and 111 are again carried out in the former case (step 112), or, for the latter case, steps 108 and 109 are carried out again (step 113).

When transmission of the program which is being viewed ends (step 114), it is checked whether another program of the selected category is being transmitted (step 115), and if so, its corresponding broadcasting channel is displayed, allowing the user to recognize it (step 116). Then, steps 110 to 115 are repeated. However, if such a program does not exist in step 115, it is checked whether the user's control information to change the broadcasting mode to normal is supplied. If it is, step 102 is performed, and if not, the operation ends (step 117).

As described above, the present invention classifies the programs sent from the broadcasting station into similar-typed programs using a VPS function, assigns them as user-designated channels and automatically detects information from sources transmitting the same type of program according to the user-designated channel selection, so that a desired channel may be easily selected in a program category. Moreover, with the present invention, it is now unnecessary to scan every channel to select a desired program to be viewed.

What is claimed is:

1. A channel selecting method for programs of a same category in a broadcasting signal receiving device having a VPS decoder for decoding a video program system (VPS) code included in a video signal detected from a broadcasting signal received through an antenna and showing at least a program starting time, a system controller for recognizing information decoded in said VPS decoder, and display means for displaying said video signal under control of said system controller, said method comprising the steps of:
   classifying decoded information into similar-typed programs when information decoded in said VPS decoder is supplied to said system controller;
   making broadcast channels of the similar-typed programs, classified in said classifying step, correspond to predetermined channels arbitrarily set in said system controller;
   selecting a first broadcast channel corresponding to a desired program category from said predetermined channels;
   displaying information about the broadcast channels, corresponding to the channel selected in said first channel selection step, through said display means; and
   selecting a second broadcast channel by determining which broadcast channel is desired to be viewed in said displaying step.

2. A channel selecting method for programs of the same category as claimed in claim 1, said displaying step displaying said information about the broadcast channels as an on-screen-display information type.

3. A channel selecting method for programs of the same category as claimed in claim 2, further comprising the step of recognizing a normal broadcasting mode in said system controller and allowing direct user control of a broadcast channel when said VPS code is not included in said video signal.

4. A channel selecting method for programs of the same category as claimed in claim 2, further comprising the step of:
   selecting said broadcast channel from among the predetermined channels selected in said first broadcast channel selecting step while said selected second broadcast channel is viewed, said broadcast channel that is selected from among the predetermined channels being different from said selected first broadcast channel.

5. A channel selecting method for programs of a same category in a broadcasting signal receiving device having, at least one tuner for receiving a broadcasting signal through an antenna, a VPS decoder for decoding a video program system (VPS) code included in a video signal detected through said tuner and showing at least a program starting time, a system controller for recognizing the information decoded in said VPS decoder, and display means for displaying said video signal under the control of said system controller, said method comprising the steps of:
   classifying the decoded information into similar-typed programs when the information decoded in said VPS decoder is supplied to said system controller;
   making broadcast channels of the programs, classified in said classifying step, correspond to predetermined channels arbitrarily set in said system controller;
   selecting a first channel corresponding to the desired program category from said predetermined channels;
   displaying video information about said broadcast channels on said display means by controlling a channel selecting operation of said tuner by said system controller; and
   selecting a second broadcast channel by determining which broadcast channel is desired to be viewed in said displaying step.

6. A channel selecting method for programs of the same category as claimed in claim 4, further comprising the step of recognizing a normal broadcasting mode in said system controller and allowing the direct control of said broadcast channel by the user, when said VPS code is not included in said video signal.

7. A channel selecting method for programs of the same category as claimed in claim 4, further comprising the step of:
   selecting said broadcast channel from among the predetermined channels selected in said first broadcast channel selecting step while said selected second broadcast channel is viewed, said broadcast channel that is selected among the predetermined channels being different from said selected first broadcast channel.

8. A channel selecting method for programs of the same category as claimed in claim 1, further comprising the step of recognizing a normal broadcasting mode in said system controller and allowing direct user control of said broadcast channel when said VPS code is not included in said video signal.

9. A channel selecting method for programs of the same category as claimed in claim 1, further comprising the step of:

selecting said broadcast channel from among the predetermined channels selected in said first channel selecting step while said selected second broadcast channel is viewed, said broadcast channel that is selected from the predetermined channels being different from said selected first broadcast channel.

* * * * *